Oct. 15, 1968 A. J. S. UDALL 3,406,348
ELECTRICAL SMOOTHING CIRCUITS
Filed Aug. 10, 1964
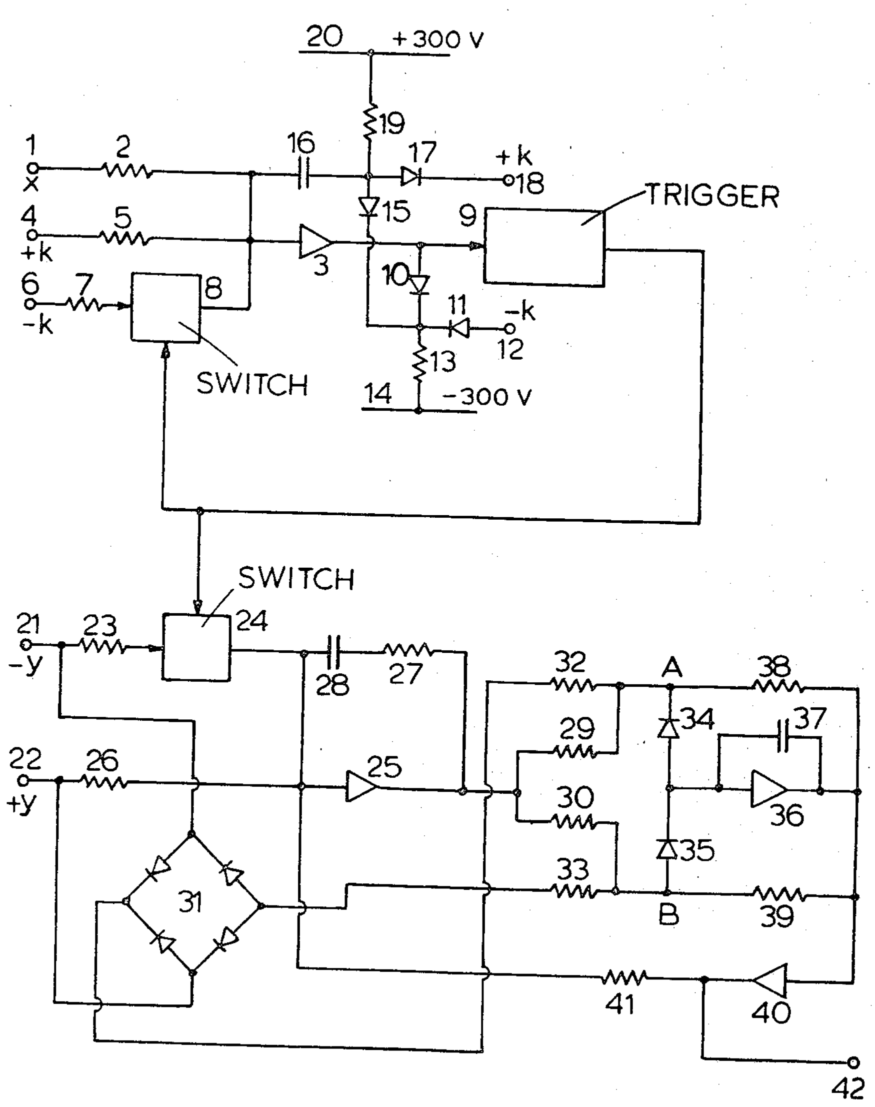

United States Patent Office 3,406,348

Patented Oct. 15, 1968

3,406,348
ELECTRICAL SMOOTHING CIRCUITS

Anthony John Shawcross Udall, Ashford, Middlesex, England, assignor to Electric & Musical Industries Limited, Hayes, Middlesex, England, a corporation of Great Britain Filed Aug. 10, 1964, Ser. No. 388,552
Claims priority, application Great Britain, Aug. 13, 1963, 32,021/63
7 Claims. (Cl. 328—165)

ABSTRACT OF THE DISCLOSURE

This specification describes a circuit for smoothing an input electrical signal consisting of a desired signal with a superimposed ripple having a storage element, such as a condenser, in which the desired signal or a signal related to it is stored. Two threshold voltages dependent on the signal stored in the storage element are set up differing by the amplitude of the ripple to define a range within which the input electrical signal can lie without affecting the signal stored in the storage element. Departure of the input electrical signal from the range is sensed by diode circuits and is used to change the signal stored in the storage element, from which element the smoothed signal is derived. Two storage elements may alternatively be used storing the threshold voltages independently.

The circuit is used to smooth the output of a time division analogue multiplier and has the advantage of avoiding unnecessary restriction of the pass band of the multiplier such as would be incurred by a conventional smoothing circuit. The multiplier described includes a diode arrangement for disconnecting the feedback condenser from the amplifier of the integrator in the rectangular wave generator at the triggering voltages, thus avoiding the need for accuracy in the triggering levels of the trigger.

This invention relates to circuits for smoothing electrical signals thereby to remove unwanted ripples from the signals.

Smoothing of an electrical signal is often carried out by means of an integrating circuit having a long time constant. However, if the signal to be smoothed is for example the rectangular waveform representing the product in a time division multiplier, the use of conventional smoothing circuits leads to an undesirable reduction in the high frequency performance of the multiplier, since the length of time constant required to perform the smoothing is long enough to attenuate the high frequency components of smoothed signal as well.

It is an object of the present invention to provide a smoothing circuit for an electrical signal in which the above disadvantage is at least partially overcome.

According to the present invention there is provided a circuit for smoothing an input electrical signal consisting of a desired signal together with a superimposed ripple, comprising storage means for the value of at least one electrical signal, means for setting up a first threshold signal of value related to a value in said storage means, means for setting up a second threshold signal of value related to a value in said storage means, the difference between said threshold signals being substantially equal to the amplitude of said ripple, means for comparing said input electrical signal with said threshold signals, means for adjusting each value in said storage means in response to said comparing means, and means for deriving said desired signal from said storage means.

In order that the invention may be fully understood and readily carried into effect it will now be described with reference to the single figure of the accompanying drawing which represents in diagrammatic form a time division multiplier having a smoothing circuit according to one example of the present invention.

In the figure, input terminal 1 is connected via resistor 2 to the input of inverting amplifier 3, input terminal 4 is connected via resistor 5 to the input of amplifier 3, and input terminal 6 is connected via resistor 7 and switch 8 to the input of amplifier 3. Resistors 2 and 5 have the same value, and resistor 7 is of half the value of resistors 2 and 5. The output of amplifier 3 is connected to the input of trigger circuit 9, and via diodes 10 and 11 to terminal 12. The junction of diodes 10 and 11 is connected by means of resistor 13 to conductor 14 which is maintained at —300 volts, and also via diode 15 and condenser 16 to the input of the amplifier 3. The junction of diode 15 and condenser 16 is connected via diode 17 to a terminal 18, and by means of resistor 19 to a conductor 20 which is maintained at +300 volts. The cathodes of diodes 10, 11 and 15 are connected together. The output of trigger 9 is connected to control switch 8 in an input to amplifier 3 and switch 24 which is referred to later. Two further input terminals 21 and 22 are provided; the terminal 21 is connected via resistor 23 to the input of switch 24, which switch is controlled by the trigger 9. The output of the switch 24 is applied to the input of amplifier 25 to which the terminal 22 is also connected by resistor 26. Resistor 23 is of half the value of resistor 26. A feedback resistor 27 and condenser 28 are provided for the amplifier 25. The output of amplifier 25 is connected to points A and B via resistors 29 and 30, respectively. A rectifier bridge 31 has two input terminals connected to terminals 21 and 22 respectively, and two output terminals connected via resistors 32 and 33 to A and B respectively. The points A and B are connected by rectifiers 34 and 35 respectively to the input of amplifier 36. The amplifier 36 has a feedback condenser 37, and has its output terminal connected by resistors 38 and 39 to the points A and B respectively. The output of the amplifier 36 is amplified by the amplifier 40 and then applied via resistor 41 to the input of amplifier 25. The output of amplifier 40 is also connected to the output terminal 42.

The circuit shown in the figure may conveniently be divided into two parts, the upper part forming a rectangular wave generator having a duty ratio representing $x/k$, a voltage analogous to $x$ being applied to the terminal 1, and the lower part forming a modulator for the rectangular wave produced by the upper part to set the limits of the excursion of the rectangular wave at $+y$ and $-y$, represented by voltages applied to terminals 22 and 21 respectively. The lower part of the drawing also includes the means for smoothing the rectangular wave to produce an output voltage representing $$\frac{x.y}{k}$$

Voltages representing $+k$ are applied to terminals 4 and 18, and voltages representing $-k$ are applied to terminals 6 and 12.

The switch 8 is non-conductive when the trigger 9 is in the "0" state and is conductive when the trigger 9 is in the "1" state. Assume that the trigger 9 is in the "0" state, and that the output of amplifier 3 is more negative than $+k$, so that both diodes 10 and 15 are conducting thereby connecting condenser 16 as a feedback condenser for amplifier 3. Under these conditions the output voltage of the amplifier falls linearly at a rate proportional to $(x+k)$ until it reaches the value $-k$ when the diode 10 ceases conducting, because its cathode is limited at $-k$ by the diode 11, thus disconnecting the condenser 16 from the output of amplifier 3, the voltage at which is then free to fall rapidly to the negative saturation voltage of the amplifier. The trigger 9 is arranged to have its triggering level for the "0" to "1" state transition just negative of $-k$, and its triggering level for the "1" to "0" state transition just positive of $+k$. Thus the trigger 9 changes to the "1" state, so that the input current to the amplifier 3 becomes proportional to $$(x+k-2k)=(x-k)$$

The magnitude of the voltage $x$ is less than the magnitude of the voltage $k$, so that $(x-k)$ is of opposite sign to $(x+k)$ and therefore the output voltage of amplifier 3 rises rapidly to $-k$ at which value diode 10 conducts again, and the voltage then rises linearly at a rate proportional to $(x-k)$ until it reaches $+k$, when the diode 15 becomes non-conducting because its anode is limited at $+k$ by diode 17, so that the condenser 16 is disconnected from the output of amplifier 3 again. The output voltage of the amplifier 3 then rises rapidly, the trigger 9 changes state from "1" to "0" switching the input current to the amplifier 3 back to $(x+k)$ and then the output voltage of the amplifier 3 falls rapidly to $+k$ causing the diode 15 to become conducting again. The cycle then recommences. The rapid rises and falls of the voltage at the output of the amplifier 3 when disconnected from the condenser 16 take negligible time, so that the duty ratio of the trigger 9 is determined by the linear rises and falls in voltage occurring whilst the output of amplifier 3 is connected to the condenser 16.

Thus the operation of components 1 to 20 as a rectangular wave generator is basically conventional and well-known, but the diodes 10, 11, 15 and 17 together with associated resistors and voltages serve to provide the limits for the linear rises and falls in the output voltage of amplifier 3, thereby avoiding the necessity for very accurate setting of the triggering levels of the trigger 9. Moreover, since the lengths of the linear rises and falls are determined by the values of $+k$, and $-k$, which are independent of the trigger, the value of $k$ may be varied, thereby providing facilities for division as well as multiplication with the current shown.

The gate 24 is opened when the trigger 9 is in the "1" state so that the current fed to the input of the amplifier 25 from the terminals 21 and 22, to which voltages of $-y$ and $+y$ respectively are applied, is in the form of a rectangular wave having alternate portions proportional to $-y$ and intervening portions proportional to $+y$, the average value of the current being proportional to $$\frac{-x.y}{k}$$

The resistor 41 is of the same value as resistor 26 and assuming that the voltage generated at the output terminal 42 is $$\frac{x.y}{k}$$

it follows that the average total current fed to the input of the amplifier 25 is zero.

Because the feedback circuit of the amplifier 25 includes a resistor 27 in addition to the condenser 28, the output waveform from the amplifier 25 consists of a step and a ramp both going positively followed by a step and a ramp both going negatively, and so on. This output waveform is symmetrical about the zero axis, since the average total current is zero for static conditions of input voltage.

The rectifier bridge 31 is connected to the terminals 21 and 22 and produces at its left hand output a voltage equal to $+|y|$ and at its right hand output $-|y|$. Resistors 29, 32 and 38 are so chosen that the most negative potential assumed by the point A is zero under static conditions for $x$ and $y$ if the output voltage of the amplifier 40 is equal to $$\frac{x.y}{k}$$

Similarly resistors 30, 33 and 39 are so chosen that the most positive potential assumed by the point B is zero under the same conditions. Thus the voltage stored on the condenser 37 is proportioned to $$\frac{-x.y}{k}$$

and is such that when amplified by the amplifier 40 becomes equal to $$\frac{x.y}{k}$$

Note that amplifiers 25, 36 and 40 all produce inversion of the signal applied to them, and may take any suitable form.

Suppose now that the value of $x$ becomes more positive, then the positive going ramp in the output of the amplifier 25 becomes longer and its negative going ramp shorter, with the result that the point B becomes positive for a small part of the waveform so that a positive signal passes through the diode 35 to the amplifier 36 thus increasing negatively the voltage stored in the condenser 37. Thus the output voltage at the terminal 42 becomes more positive, and by virtue of the feedback through the resistor 41 the zero total average current fed to the amplifier 25 is restored.

A change in the value of $y$ changes the size of the steps and the slopes of the ramp in the output waveform of the amplifier 25, which ultimately changes the voltage on the condenser 37 and restores the zero total average input current to the amplifier 25. A change in $y$ also changes the biasing of the points A and B relative to the input of the amplifier 36, so as to alter the "dead-space" generated by the $+|y|$ and $-|y|$ biases from the bridge 31 in conjunction with the diodes 34 and 35. This "dead-space" is equal to the amplitude of the output waveform of the amplifier 25 and is maintained so by its dependence on $|y|$. Alternatively, the "dead-space" may be defined by a voltage stored on a condenser, for example, which voltage is adjusted in response to the signal to be smoothed by peak rectification techniques. In another modification two voltages are stored independently, one following the upper extremes of the signal ripples and the other following the lower extremes of the ripples, the output signal being the mean of the stored voltages.

The resistor 27 serves to stabilise the loop including the three amplifiers 25, 36 and 40 and the resistor 41, and also introduces some of the rectangular waveform applied to the input of the amplifier 25 into the output waveform of this amplifier, thereby to speed up the response of the condenser 37 to changes in the value of $y$.

Many other ways of producing a "dead-space" will be evident to those skilled in the art, and the smoothing circuits so produced may be used to smooth electrical signals other than those generated in a time division multiplier. It should be noted that certain types of waveform such as, for example, a rectangular wave having a mark to space ratio other than 1:1, would, if applied to a "dead-space" directly, produce an incorrect result. In such cases, as described above with reference to the figure, the waveform may be integrated or processed in some other manner to produce a waveform for which the average value is mid-way between the extremes.

What I claim is:

1. A circuit for smoothing an input electrical signal consisting of a desired signal together with a superimposed ripple, comprising storage means for the value of at least one electrical signal, means for setting up a first threshold signal of value related to a value in said storage means, means for setting up a second threshold signal of value related to a value in said storage means, the difference between said threshold signals being substantially equal to the amplitude of said ripple, means for comparing said input electrical signal with said threshold signals, means for adjusting each value in said storage means in response to said comparing means and means for deriving said desired signal from said storage means.

2. A circuit for smoothing an input electrical signal consisting of a desired signal together with a superimposed ripple, comprising storage means for an electrical signal value, means for setting up first and second threshold signals having values related to the value in said storage means, the difference between said threshold signals being substantially equal to the amplitude of said ripple and means for comparing said input electrical signal with said threshold signals and for adjusting the value in said storage means in response to said comparisons, whereby the value in said storage means is that of said desired signal.

3. A circuit according to claim 1 wherein said comparing means includes means for subtracting respective threshold signals from said electrical signal to produce respective difference signals and said adjusting means including means responsive to parts of said difference signals respectively of different polarity to effect adjustments of different sign to each value in said storage means.

4. A circuit according to claim 2 wherein said storage means includes a condenser.

5. A circuit according to claim 4 wherein said storage means includes an inverting amplifier, and a feedback path including said condenser across said amplifier, and said comparing and adjusting means includes first and second networks responsive to said electrical signal, the signal value stored in said storage means and the amplitude of said ripple, each having an output terminal, and two oppositely poled diodes connected from a respective one of said output terminals to the input of said amplifier.

6. A time division multiplier including means for producing a rectangular wave of mark-to-space ratio representing a first variable and of amplitude representing a second variable, an integrator responsive to said rectangular wave to produce an output signal consisting of a signal representing the product of said first and second variables together with a superimposed ripple, and a smoothing circuit for said output signal, said smoothing circuit comprising storage means for the value of at least one electrical signal, means for setting up a first threshold signal of value related to a value in said storage means, means for setting up a second threshold signal to a value related to said value in said storage means, the difference between said threshold signals being substantially equal to the amplitude of said ripple, means for comparing the output signal of said integrator with said threshold signals, means for adjusting each value in said storage means in response to said comparing means and means for deriving the signal representing the product of said first and second variables from said storage means.

7. A multiplier according to claim 6 in which said means for producing a rectangular wave includes an inverting amplifier with a feedback path including a condenser so that the amplifier normally operates as an integrator, a trigger circuit having two triggering levels, responsive to the output of said amplifier to produce one or other of two output signals and changing the output signal when the output of said amplifier reaches a triggering level, and an input circuit for said amplifier to the sum of a signal representing said first variable and the output signals of said trigger circuit to apply different currents to said amplifier, wherein there is provided switch means responsive to the output of said amplifier to disable said feedback path when the output of said amplifier lies outside a particular range of values, said range of values lying between said triggering levels, the output signals of said trigger circuit forming a rectangular wave of mark-to-space ratio representing said first variable.

No references cited.

ARTHUR GAUSS, *Primary Examiner.*

J. D. FREW, *Assistant Examiner.*